(12) United States Patent
Sroka et al.

(10) Patent No.: US 9,086,038 B2
(45) Date of Patent: Jul. 21, 2015

(54) AIRFLOW ATTACHMENT ASSEMBLY FOR CARBURETOR

(71) Applicants: Edward J. Sroka, Waconda, IL (US); Edward J. Fox, Chicago, IL (US)

(72) Inventors: Edward J. Sroka, Waconda, IL (US); Edward J. Fox, Chicago, IL (US)

(73) Assignee: R2C Performance Products, LLC., Vernon Hills, IL (US)

( * ) Notice: Subject to any disclaimer, the term of this patent is extended or adjusted under 35 U.S.C. 154(b) by 95 days.

(21) Appl. No.: 13/715,069

(22) Filed: Dec. 14, 2012

(65) Prior Publication Data

US 2014/0165949 A1    Jun. 19, 2014

(51) Int. Cl.
*F02M 17/34* (2006.01)
*F02M 35/10* (2006.01)

(52) U.S. Cl.
CPC ................. *F02M 35/10144* (2013.01)

(58) Field of Classification Search
CPC ............ F02M 17/34; F02M 35/10196; F02M 35/10262
USPC ............... 123/198 E, 184.46, 184.21, 184.23; 261/23.2, 36.2, 41.2, DIG. 1, DIG. 12, 261/DIG. 36, DIG. 67, DIG. 69, 64.1; 55/DIG. 28, 385.3

See application file for complete search history.

(56) References Cited

U.S. PATENT DOCUMENTS

| 2,996,145 | A | * | 8/1961 | Thornburgh | ................... | 55/498 |
| 3,563,010 | A | * | 2/1971 | Wheatley | ................... | 55/510 |
| 3,906,724 | A | * | 9/1975 | Yoshizaki | ................... | 60/305 |
| 5,549,085 | A | * | 8/1996 | Endrigo | ................... | 123/184.21 |
| 5,688,299 | A | * | 11/1997 | Goodwin | ................... | 55/385.3 |
| 6,374,815 | B1 | * | 4/2002 | Ness et al. | ................... | 123/572 |
| 8,608,135 | B2 | * | 12/2013 | Schultz et al. | ................... | 261/23.2 |
| 2013/0147069 | A1 | * | 6/2013 | Schultz et al. | ................... | 261/109 |

* cited by examiner

*Primary Examiner* — Lindsay Low
*Assistant Examiner* — Tea Holbrook
(74) *Attorney, Agent, or Firm* — R. Tracy Crump (57) ABSTRACT

A carburetor attachment assembly for improved engine performance including an airflow crown and a mating air cleaner base. The air flow crown is adapted to detachably mount atop a carburetor and has a contoured intake surface that guides and directs airflow into the mouth of the carburetor. The airflow crown's intake surface is configured to merge with the sidewalls of the induction bores to form a smooth continuous surface around the mouth of the carburetor and induction bores, which helps facilitate laminar airflow and redirection of the intake air flow downward into the carburetor.

9 Claims, 15 Drawing Sheets

AIRFLOW ATTACHMENT ASSEMBLY FOR CARBURETOR

This invention relates to performance accessories for internal combustion engines, and in particular, an airflow attachment assembly for carbureted engines.

BACKGROUND OF THE INVENTION

While fuel injection and other technology have replaced carburetors in most automobiles, carburetors are still used in certain classes of race and high performance vehicles. Carburetors are fuel control devices mounted to an engine intake manifold, which divide and transport the air/fuel mixture into the intake valves. In its simplest form, a carburetor consists of an open pipe through which the air passes into the inlet manifold of the engine. Carburetors use Bernoulli's principle to mix fuel into an air stream, which feeds the engine. Rather than directly controlling the flow of liquid fuel, carburetors meter the flow of air being pulled into the engine. The speed of this flow, and therefore its pressure, determines the amount of fuel drawn into the airstream.

Carburetors may have one or more air induction bores, which are defined by contoured bore walls which converge to form a venturi. Fuel is introduced into the air stream through small holes at the narrowest part of the venturi. The constriction of the air flow through the venturi increases the velocity of air flow, thereby lowering the static pressure, which draws fuel into the airstream through a nozzle or nozzles located in the center of the venturi. Below the venturi is a butterfly valve called the throttle valve—a rotating disc that can be turned end-on to the airflow, so as to hardly restrict the flow at all, or can be rotated so that it almost completely blocks the flow of air. The throttle valves control the flow of air through the induction bores and thus the quantity of air/fuel mixture the system will deliver, thereby regulating horse power and speed.

In race and high performance applications, the ability to make quick mechanical adjustments to a carburetor is very desirable in order to accommodate for changing environment and race conditions. Mechanical carburetor adjustments affect the engine's power curve, which represents an engine's horsepower graphed against RPMs, to suit desired performance criteria. Conventional carburetors have a variety of mechanical adjustments for the various valves, jets, boosters and linkages, which allow carburetors to be tuned for optimum performance; however, the complexity, variety and interdependence of these mechanical adjustments are impractical for addressing rapidly changing conditions.

Moreover, even the slightest gains in engine performance are desirable in race and high performance applications. The power curve of any given engine can be affected by a variety of factors, including the speed and nature of the air flow into the induction bores of the carburetor. Turbulent air around the mouth of the carburetor can restrict air flow through the induction bores, resulting in losses in horse power. Conventional carburetor bodies have shaped and contoured surfaces around the mouth of the carburetor that do not transition smoothly into the sidewalls of the induction bores, thereby creating "dead spaces" that disrupt the laminar air flow into the bores. These surfaces produces eddies and turbulent air flow in these "dead spaces" which compromises engine performance. Turbulent air flow into the carburetor can also be exacerbated by the use of an air filter assembly mounted atop the carburetor to filter dust and debris from the inlet air. A typical air filter assembly includes an annular ring type filter seated within a filter housing that mounts atop the carburetor so that air flows radially through the filter, but is then drawn downward into the mouth of the carburetor. Again the radial filter configuration and surface contours of the air filter assembly often hinder laminar airflow into the carburetor, which results in a loss in horse power.

SUMMARY OF THE INVENTION

The present invention provides a carburetor attachment assembly that improves engine performance. Each embodiment of the carburetor attachment assembly consists of a airflow crown and an optional mating air cleaner base. The air flow crowns are adapted to detachably mount atop any conventional carburetor. Each airflow crown embodiment has a contoured intake surface that guides and directs airflow into the mouth of the carburetor. The airflow crown's intake surface is configured to merge with the sidewalls of the induction bores to form a smooth continuous surface around the mouth of the carburetor and induction bores, which helps facilitate laminar airflow and redirection of the intake air flow downward into the carburetor. The various embodiments of this invention vary in height, intake and carburetor configuration, and are designed to be used interchangeably on a given carburetor for elective use to provided unique performance improvements for that given engine. The use of interchangeable airflow crowns also provides a quick and easy way for adjusting engine performance without mechanically adjusting the many delicate and complex valves, springs and other mechanical settings of the carburetor itself. The mating air cleaner base is fitted to the airflow crown and allows conventional air filter assemblies to be used in conjunction with the crown. The airflow crown may be used independently from the air filter base as desired.

The above described features and advantages, as well as others, will become more readily apparent to those of ordinary skill in the art by reference to the following detailed description and accompanying drawings.

BRIEF DESCRIPTION OF THE DRAWINGS

The present invention may take form in various system and method components and the arrangement of systems and method components. The drawings are only for purposes of illustrating exemplary embodiments and are not to be construed as limiting the invention. The drawings illustrate the present invention, in which.

DESCRIPTION OF THE PREFERRED EMBODIMENT

Referring now to the drawings, the carburetor attachment assemblies of this invention generally consist of two separate components: an airflow crown, which detachably mounts atop a carburetor and a mating air filter base, which fits to the airflow crown. The airflow crown and the air filter base of this invention are typically molded or constructed of suitable plastic, but may be made of other suitable materials, such as metals or other composites. The mating filter base allows conventional air filter assemblies to be used in conjunction with the airflow crown; however, the airflow crowns may be used independently of the filter bases as desired. In environments where an air filter is desirable or necessary, a filter base sits atop an airflow crown so that a conventional air filter and cover plate can be used with the attachment assembly of this invention. In other operating environments, where it is often desirable and necessary to operate an engine without an air filter, an airflow crown may be mounted to a carburetor without a filter base.

Various embodiments of the airflow crown and mating filter bases of this invention are illustrated and described herein. In each embodiment, the airflow crowns and filter bases have a curved contoured upper intake surface that is conforms to the shape and contour around the mouth of the carburetor to form a smooth, continuous airfoil surface into the induction bores, thereby improving laminar airflow into the induction bores. Each embodiment of this invention generally differs only in the height and the configuration of the airflow crown, which guides and directs the airflow into the individual induction bores. It should be noted that the airflow crowns and filter bases may be adapted within the teachings of this invention for use with any particular carburetor regardless of style or barrel configuration.

For simplicity of explanation only, the various embodiments of the carburetor attachment assemblies of this invention are illustrated and described in use with a carburetor, which is designated in the drawings generally by reference number 10. As shown, carburetor 10 is generally illustrated as a generic conventional "four barrel" carburetor having four identical induction (venturi) bores 31 arranged in a square configuration. The top of carburetor 10 also has an annular peripheral shoulder 12, which forms a seat for a conventional air cleaner assembly. The top of carburetor 10 also has a recessed clover-shaped mouth 21 inset from the peripheral shoulder 12, which is defined by a contoured sidewall 20. The clover-shaped and contoured sidewall 20 of mouth 21 forms a peripheral air horn around the induction bores 31. Induction bores 31 are defined by sidewalls 30. A center column 40 extends upward from the carburetor body between the four induction bores 31. Center column 40 has a threaded axial bore for receiving a threaded post 42, which is used to secure conventional air filter assemblies to carburetor 10. Carburetor 10 also include two side posts 44 that extend upward from the carburetor body at the sides of recessed mouth 21.

FIGS. 1-7 illustrate an embodiment of the carburetor attachment assembly of this invention, which is designated generally as reference numeral 100. Attachment assembly 100 includes an airflow crown 110 and a separate mating air filter base 140. Airflow crown 110 has a two piece construction, which includes a top ring 120 and a base ring 130 that are joined together by screws 112, but may be integrally joined or bonded together using adhesives, sonic welds or other suitable means. Top ring 120 has a flat annular flange 122 and an annularly curved "horn" or "intake" surface 124 in an "open intake" configuration. Base ring 130 is an annulus defined by a sloped outer wall 132, an upper annular flange 134, an annular wall 136, and an annular rim 138 extending from the bottom wall. Rim 138 is dimensioned to mate against carburetor shoulder 12 of carburetor 10. Base ring 130 has a pair of downward extending legs 114 and a pair of spring loaded pull pins 116, which are used to secure airflow crown 110 to carburetor 10. In other embodiments, pull pins may be replaced by other quick attachment mechanisms, such as screws, keys and the like. An annular gasket 118 is affixed by an adhesives to rim 138.

As shown in FIG. 1-7, airflow crown 110 has an "open intake" where the curvature and shape of intake surface 124 funnels into carburetor mouth 21 and conforms to the shape and slope of mouth sidewall 20 which defines the carburetor mouth 21. Geometrically, the curvature and shape of intake surface 124 is typically generated by a convex arc projected radially about the peripheral shape of mouth sidewall 20. As shown, intake surface 124 meets mouth sidewall 20, so that the two surfaces are contiguous and together provide a substantially smooth, continuous airfoil surface into the induction bores.

Figure 7:
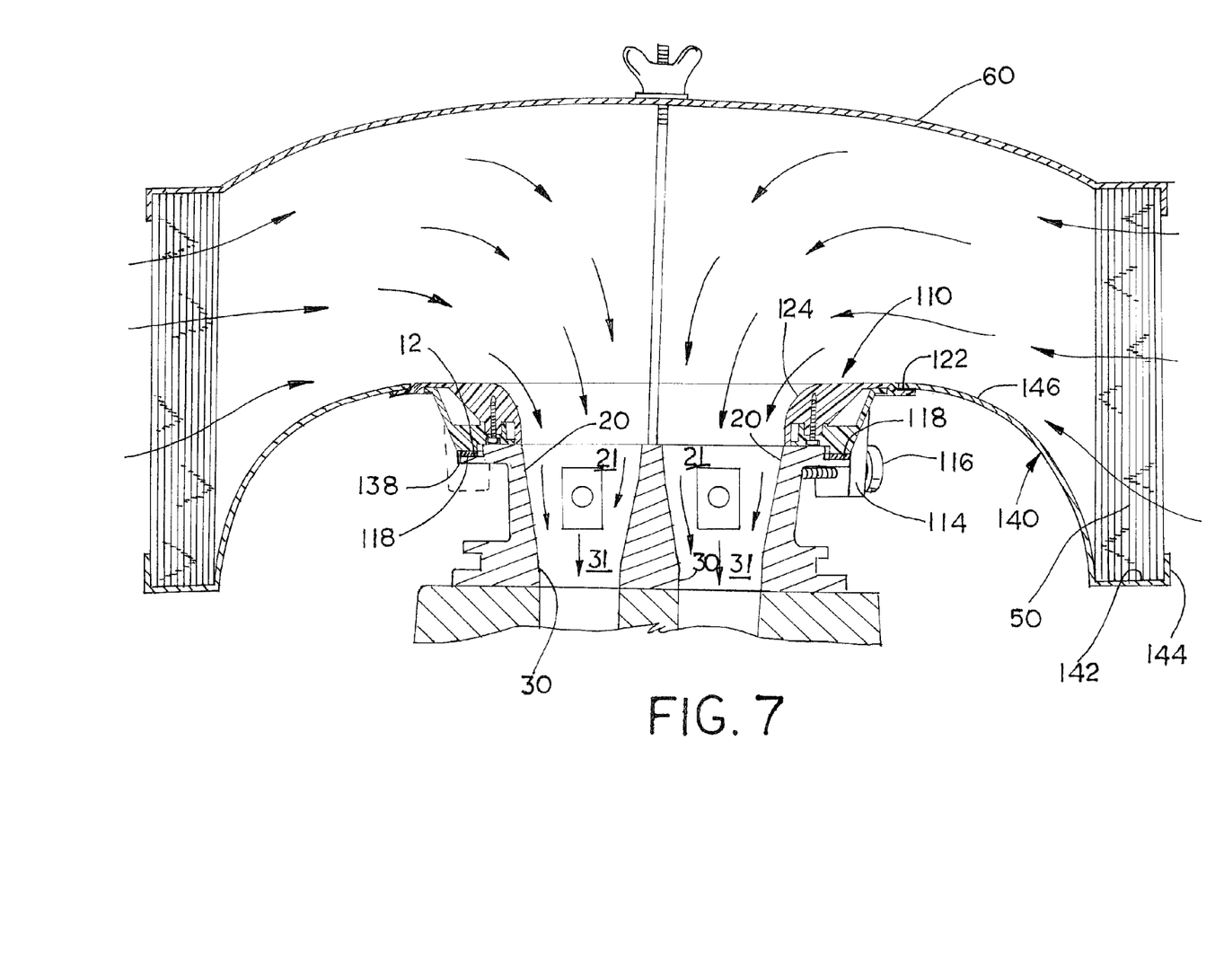
FIG. 7 is a simplified side sectional view of the attachment assembly of FIG. 1 showing airflow through an air filter into the carburetor.

As shown in FIG. 7, airflow crown 110 sits atop carburetor 10 with rim 128 seated on carburetor shoulder 12. Gasket 118 provides a hermetic seal, which prevents air from leaking between the base ring and carburetor body. Airflow crown 110 is secured to carburetor 10 by pull pins 116, which extend inward to engage the bottom of carburetor shoulder 12. Pull pins 116 allow airflow crown 110 to be quickly and easily mounted to carburetor 10 without tools. When mounted to carburetor 10, airflow crown 110 acts as an airflow "funnel" or "director," which guides and promotes improved laminar airflow into induction bores 31. Top surface 134 of airflow crown 110 merges contiguously into the sidewall of carburetor mouth 21, which improves laminar airflow into induction bores 31.

Figure 1:
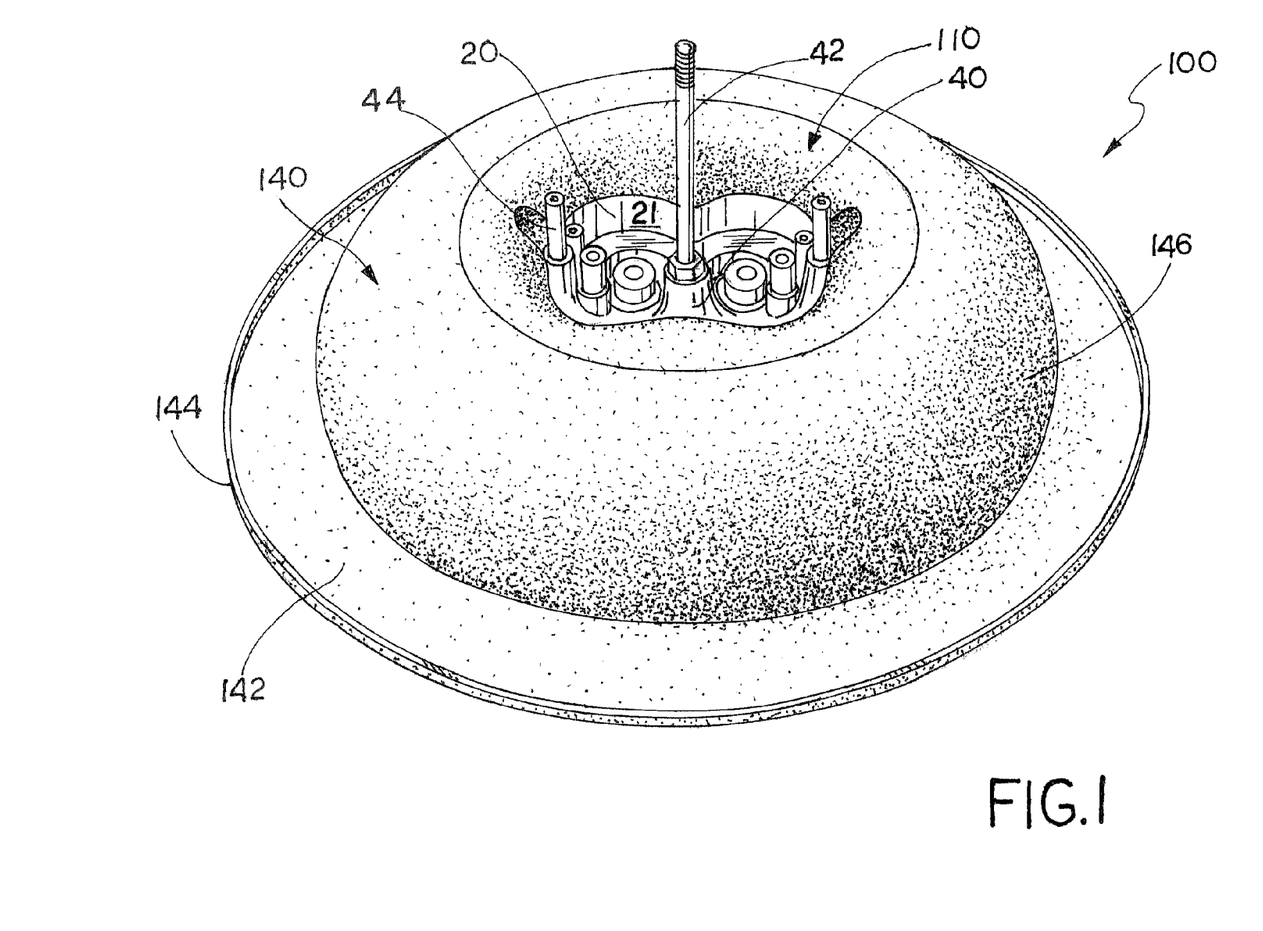
FIG. 1 is a perspective view a first embodiment of the attachment assembly of this invention mounted atop a conventional four barrel carburetor.
Figure 2:
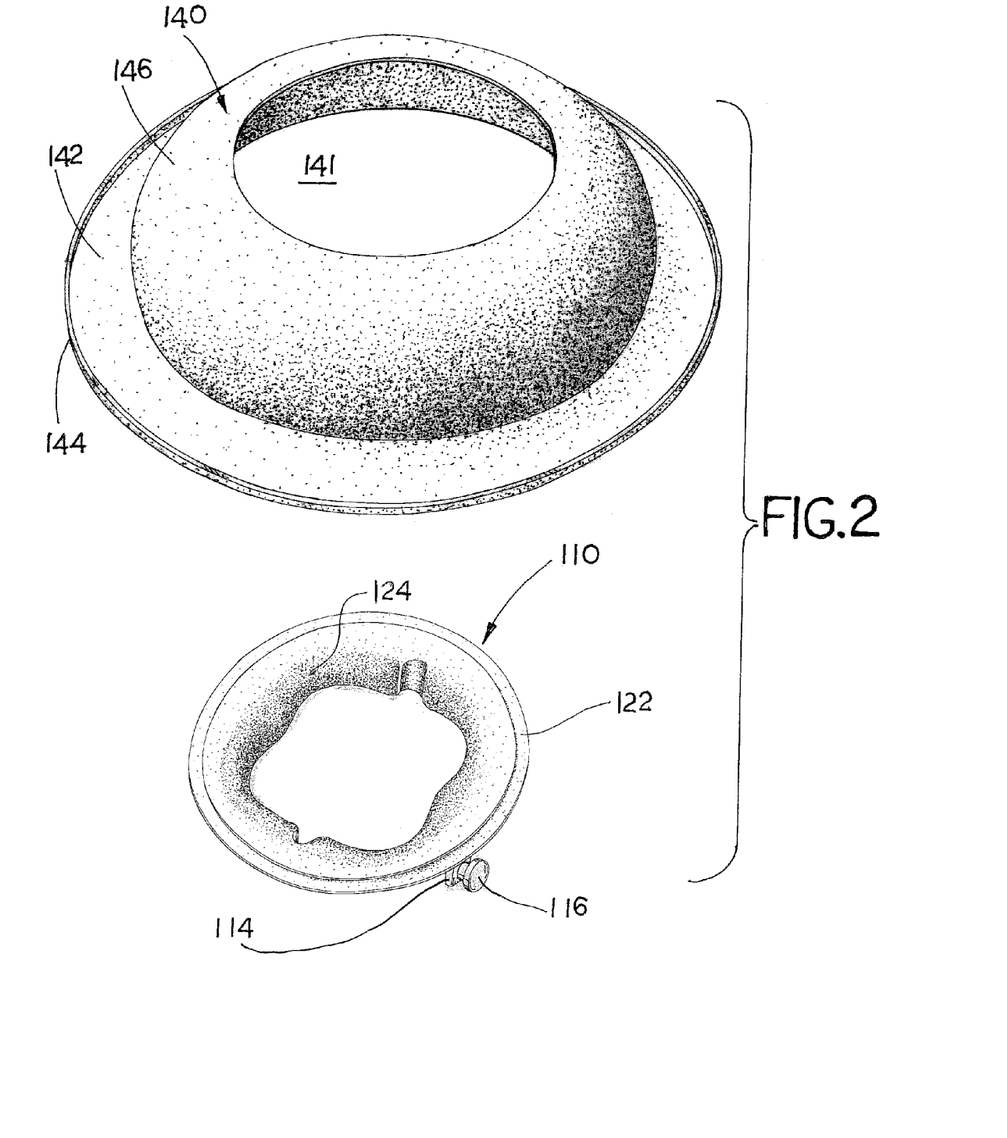
FIG. 2 is an exploded perspective view of the attachment assembly of FIG. 1.
Figure 3:
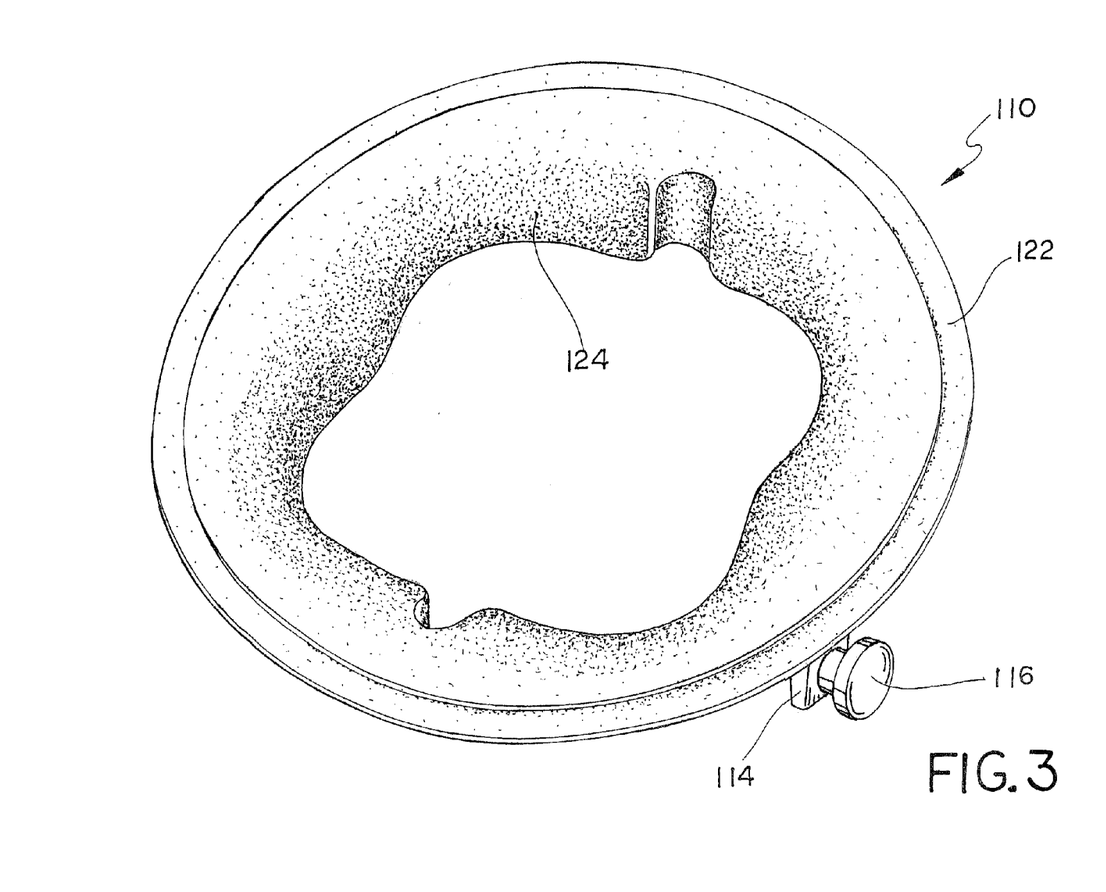
FIG. 3 is a perspective view of the airflow crown of the attachment assembly of FIG. 1.
Figure 4:
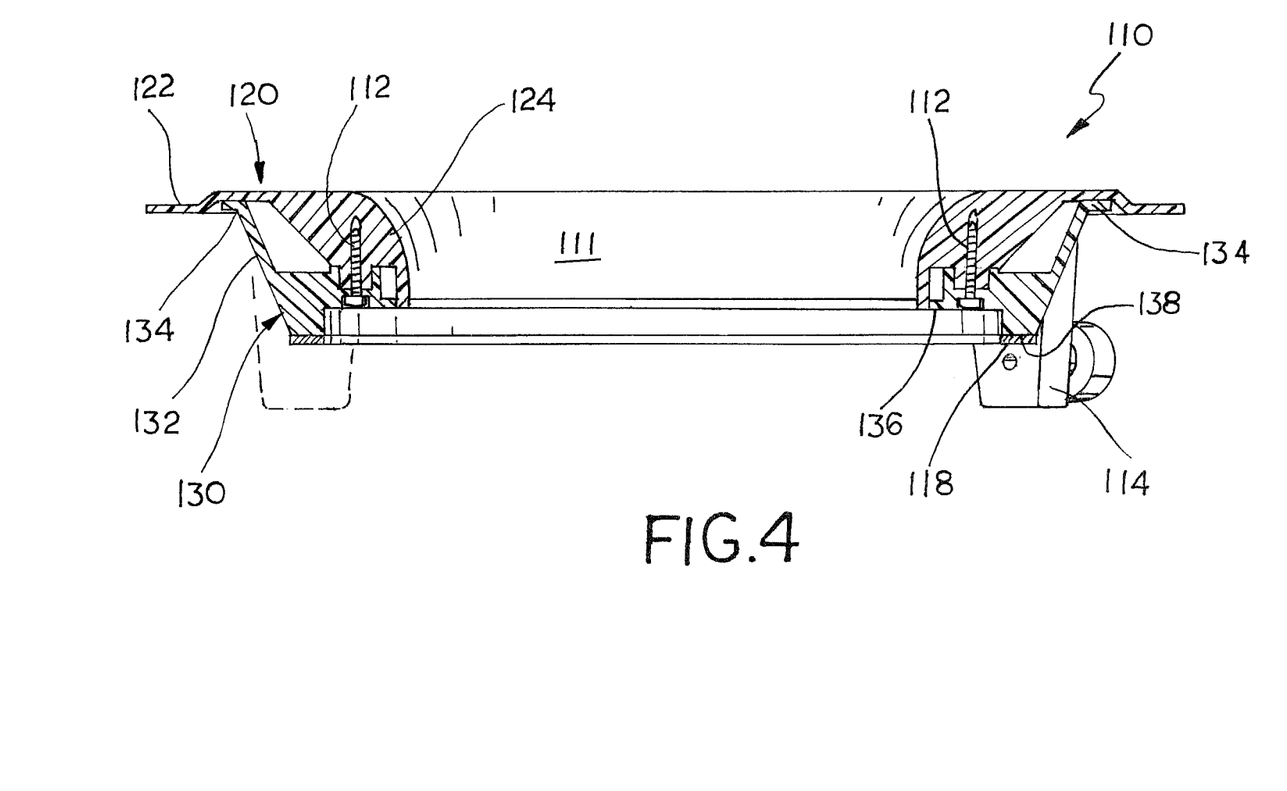
FIG. 4 is a side sectional view of the airflow crown of FIG. 1.
Figure 5:
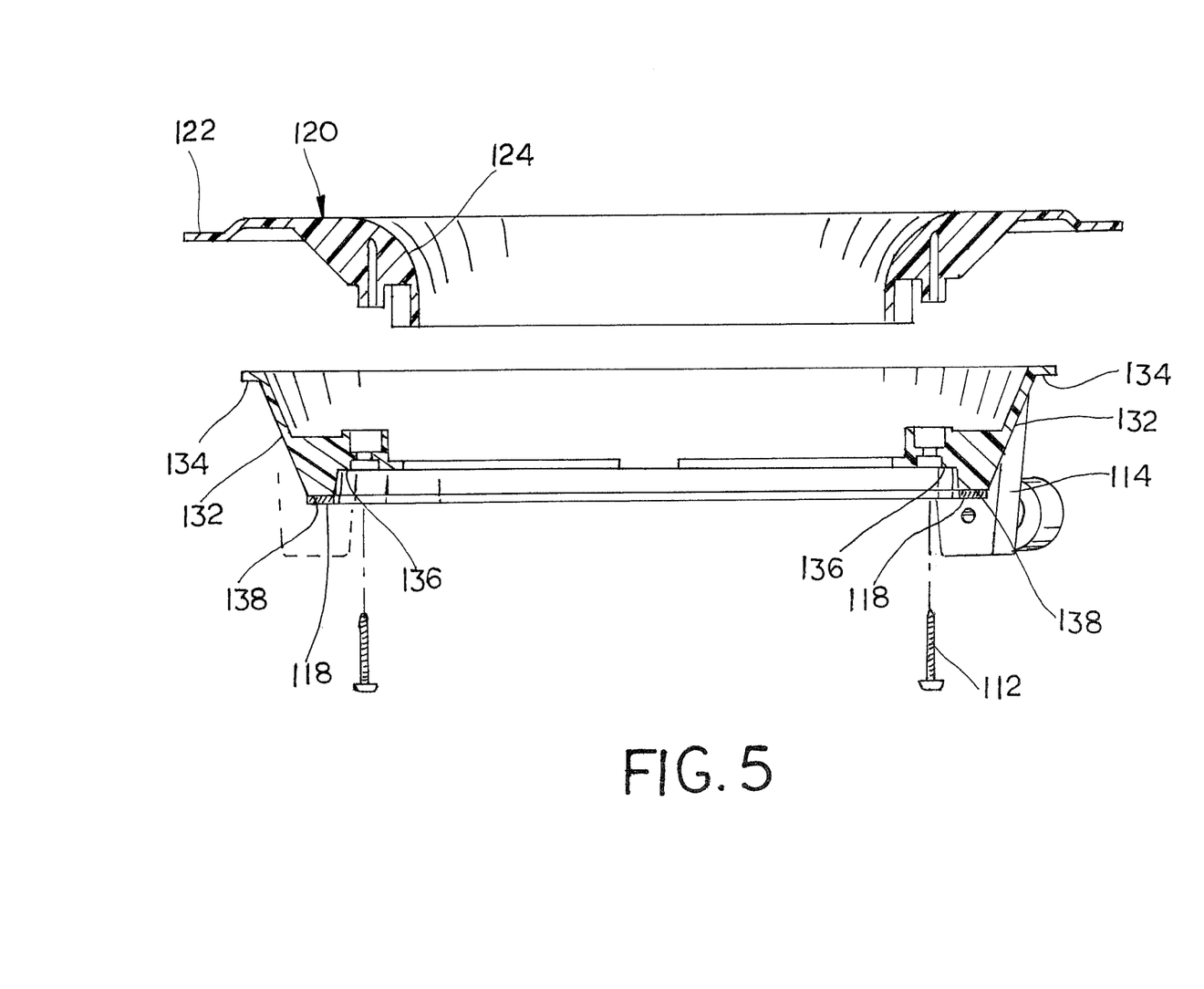
FIG. 5 is an exploded side sectional view of the airflow crown of FIG. 1.
Figure 6:
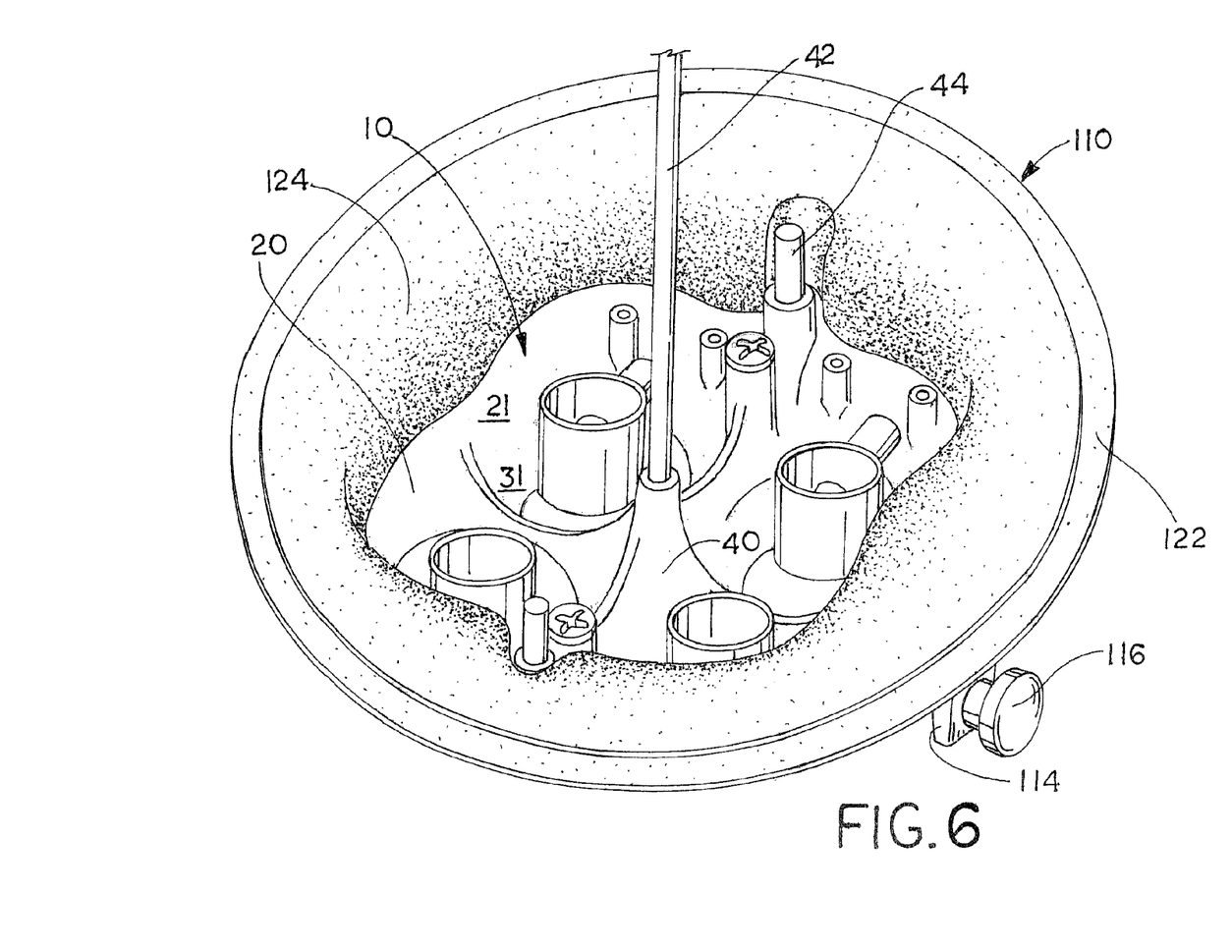
FIG. 6 is a perspective view of the airflow crown of FIG. 1 mounted to a four barrel carburetor.

As shown in FIGS. 1, 2 and 7, air filter base 140 acts as a conventional air filter base, that mates with airflow crown 110 to maintain a smooth, continuous airfoil surface into induction bores 21. Filter base 140 is an annulus having a flat peripheral tray 142 and a domed inner wall 146 with a central opening 141. Peripheral tray 142, which receives a conventional annular air filter 50. Peripheral tray 142 terminates in an upturned flange 144. Central opening 141 is dimensioned so that filter base 140 will nest atop airflow crown 110. Filter base 140 is sized and dimensioned to provide a platform for supporting cylindrical air filters 50. The diameter size and particular configuration may vary to accommodate any particular air filter that may be used in any particular application. As with conventional air cleaner assemblies, filter base 140 and airflow crown 110 are secured together, along with air filter 50 and a conventional air filter cover (not shown) by the clamping force of a wing nut (not shown) or similar fastener turned onto thread post 42 that extends from center post 40.

Figure 8:
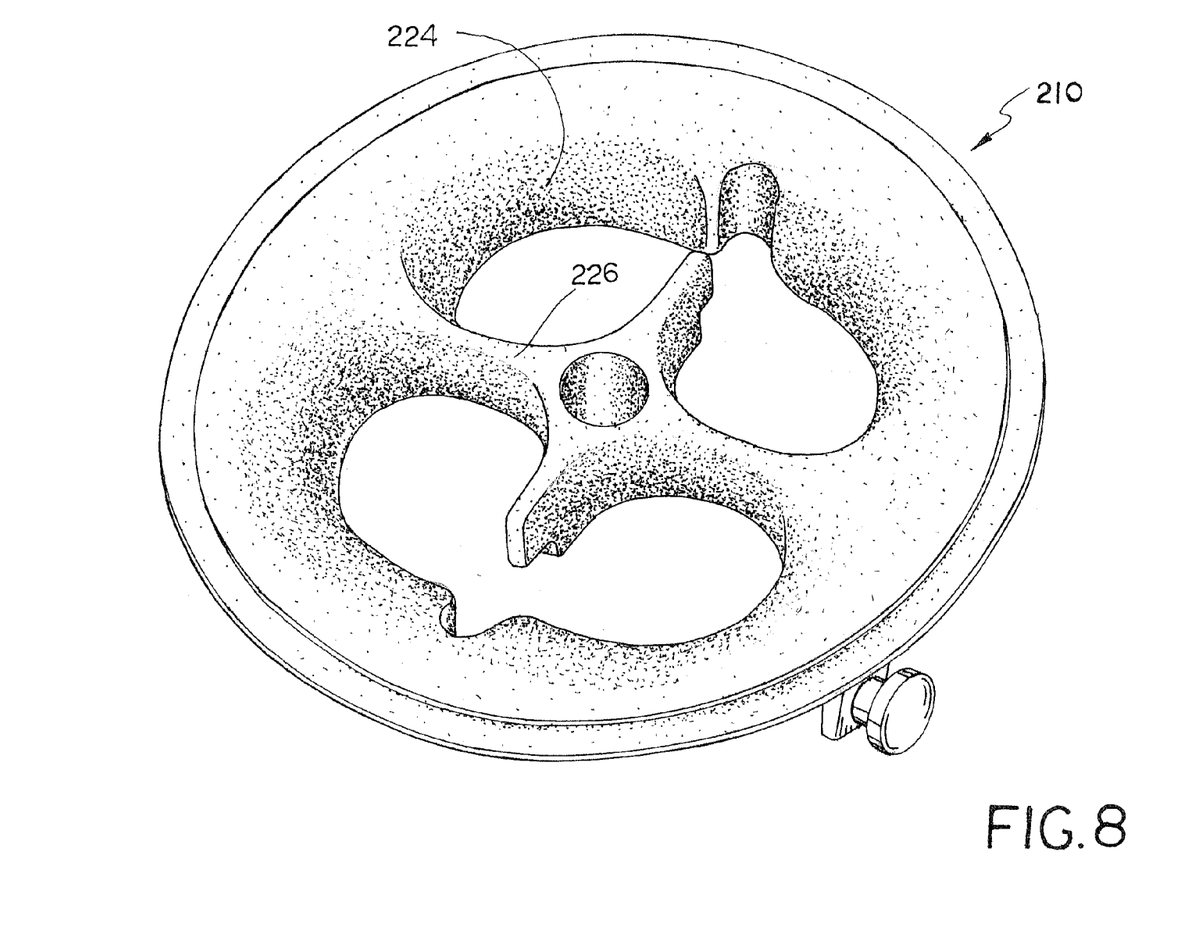
FIG. 8 is a perspective view a second embodiment of the airflow crown of this invention.
Figure 9:
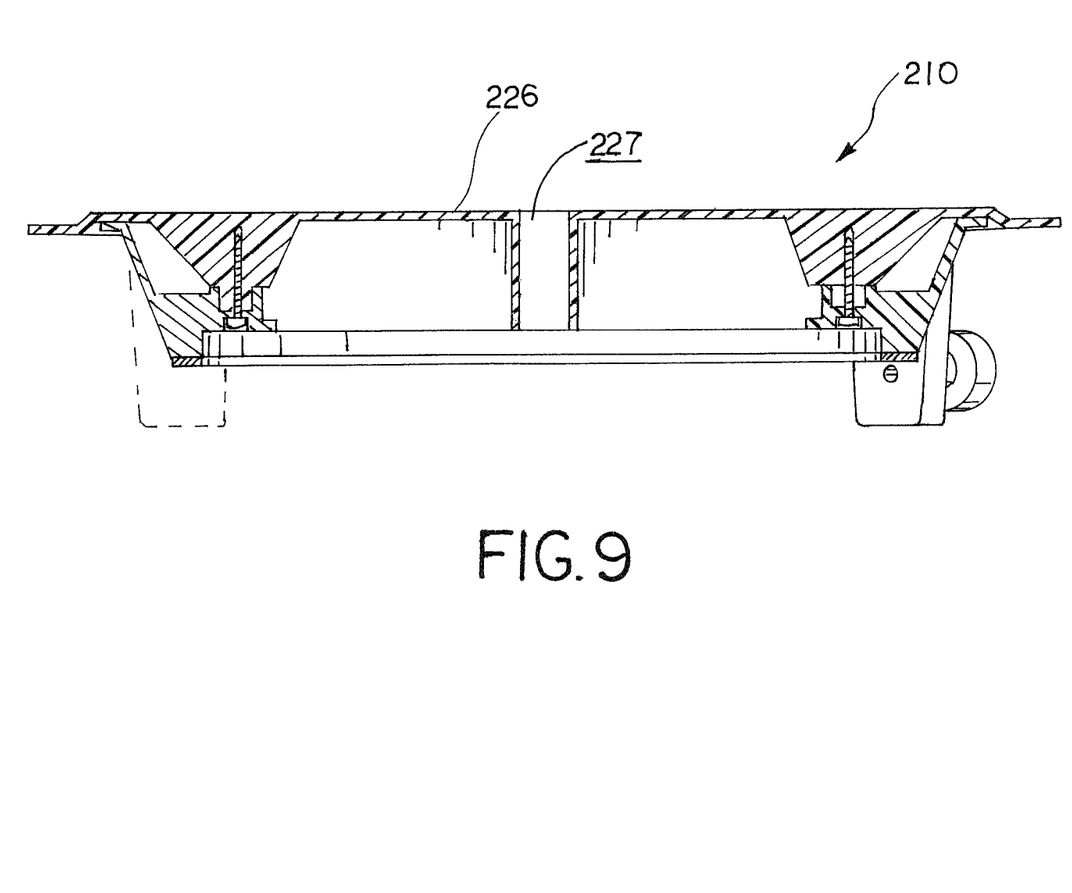
FIG. 9 is a side sectional view of the airflow crown of FIG. 8.
Figure 10:
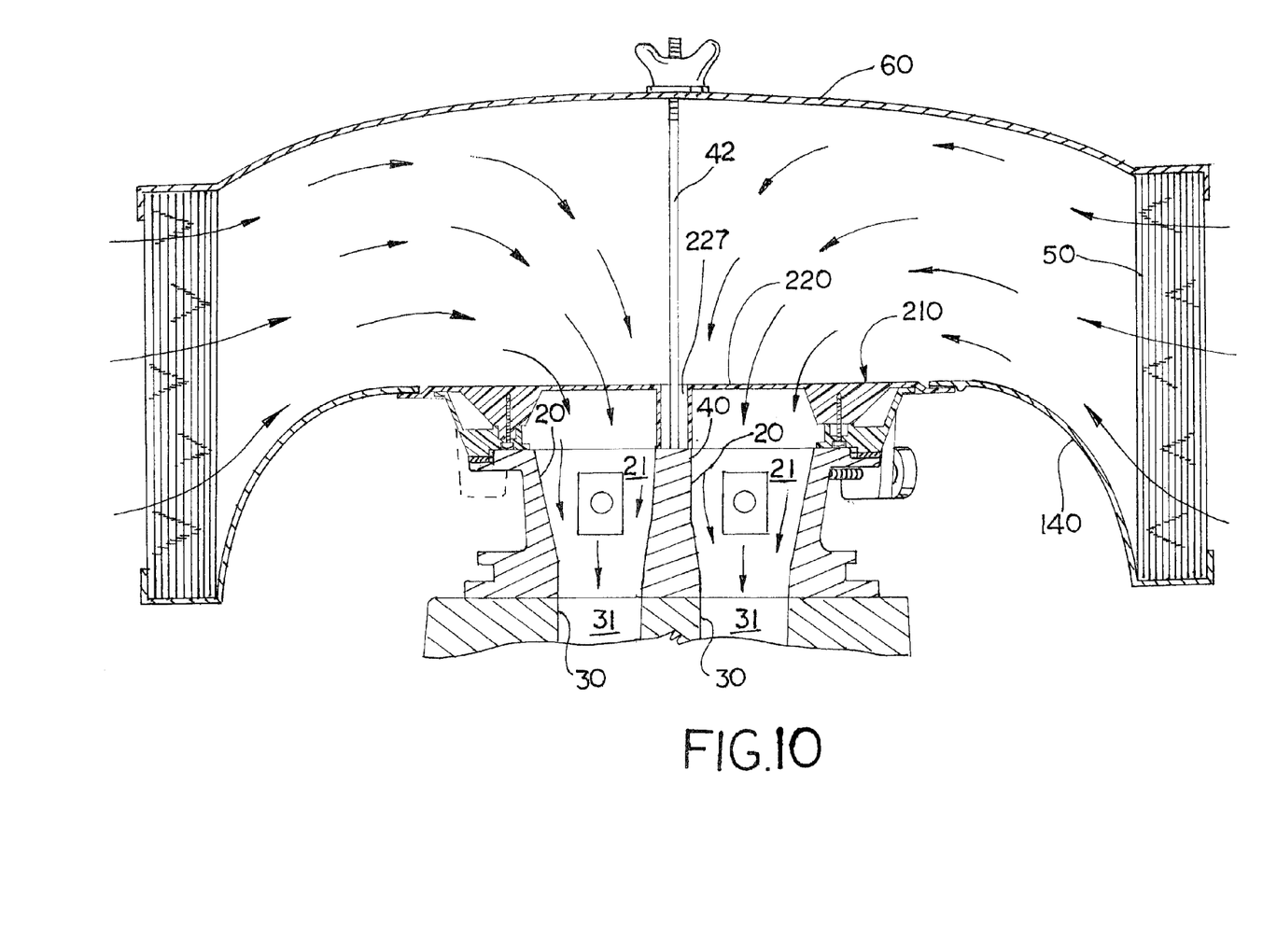
FIG. 10 is a simplified side sectional view of the attachment assembly using the airflow crown of FIG. 8 showing airflow through an air filter into the carburetor.

FIGS. 8-10 illustrate a second embodiment of the airflow crown of this invention, which is designated generally as reference numeral 200. Airflow crown 200 is substantially identical to airflow crown 100 in construction, configuration, dimension and function, except that airflow crown 200 has a "divided intake" created by an integral cruciform partition 226. Partition 226 divides and directs the inlet airflow through four separate passages at the mouth of carburetor 10 into each induction bores 31. Partition 226 projects integrally from curved intake surface 224 across the diameter of top ring 210. The side walls of cruciform partition 226 extend partially around and downward into each induction bore 31. As shown, the curvature and shape of intake surface 224 merge smoothly and continuously into the sidewalls of partition 226 around each induction bore to promote laminar airflow into the induction bores. Partition 236 has a central opening 237 through which a thread filter post extends.

Figure 11:
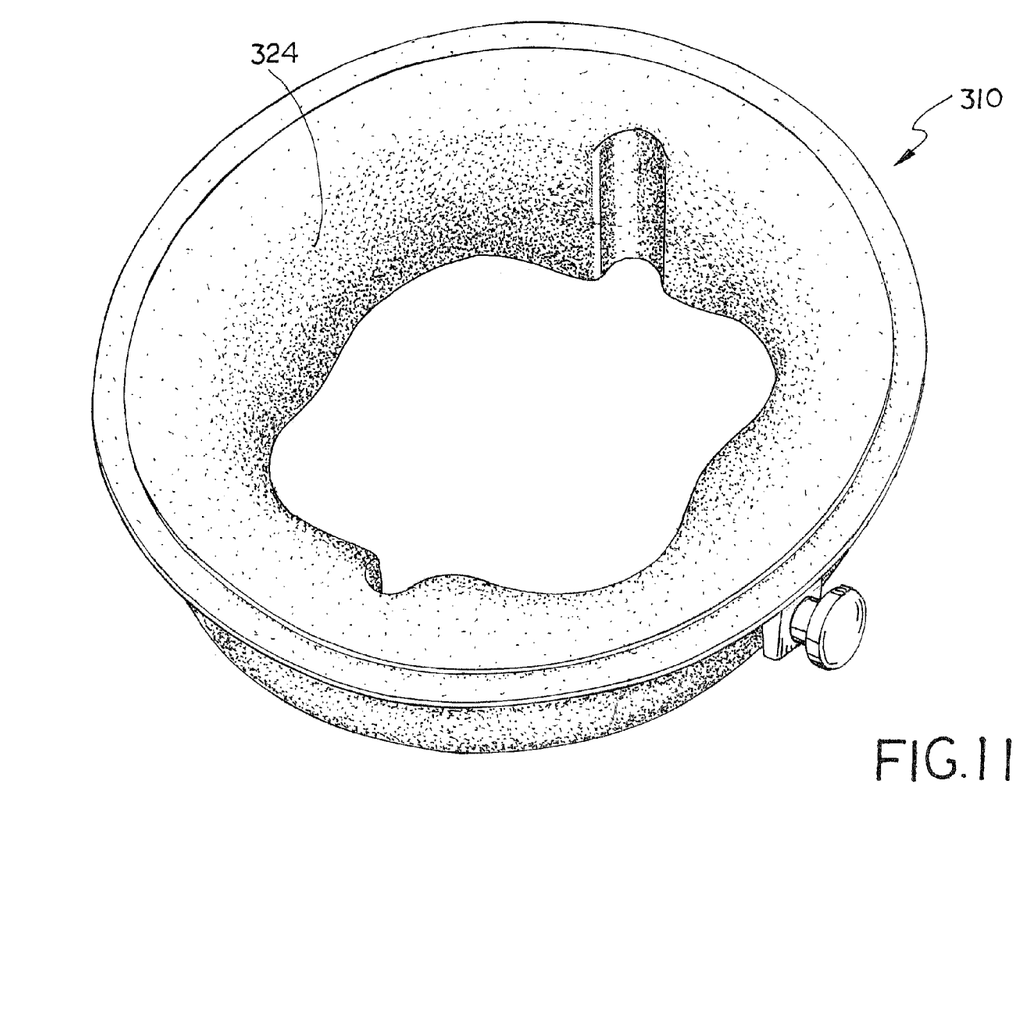
FIG. 11 is a perspective view of a third embodiment of the airflow crown of this invention.
Figure 12:
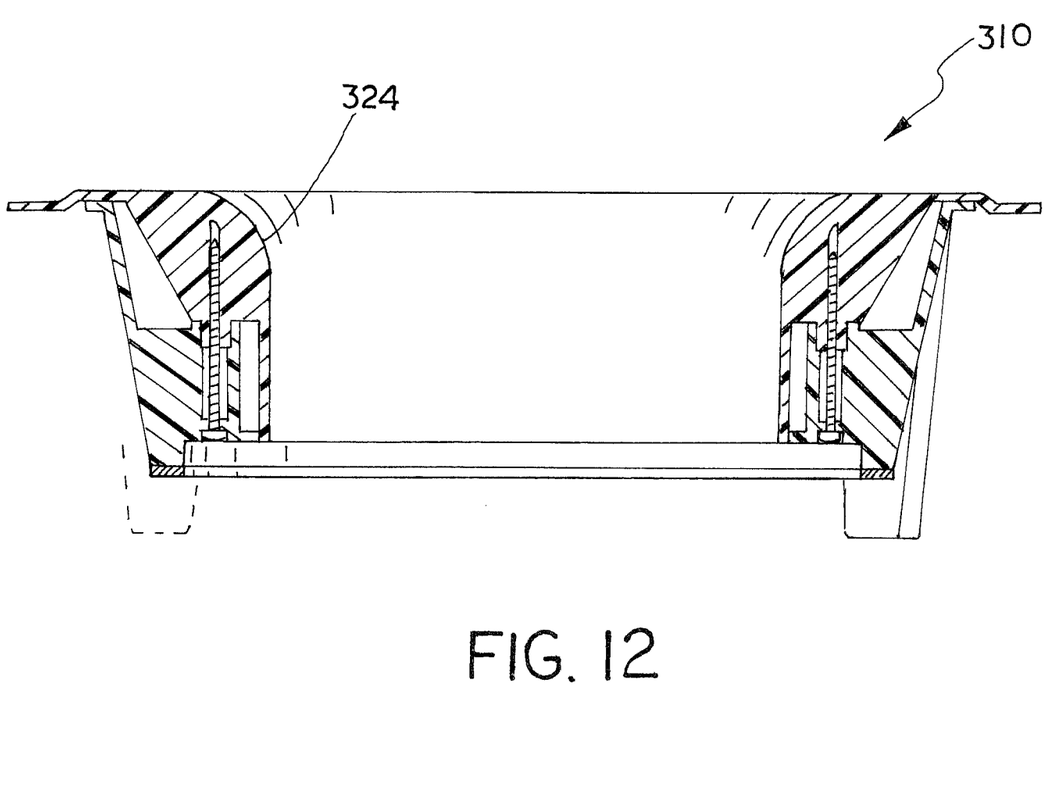
FIG. 12 is a side sectional view of the airflow crown of FIG. 11.
Figure 13:
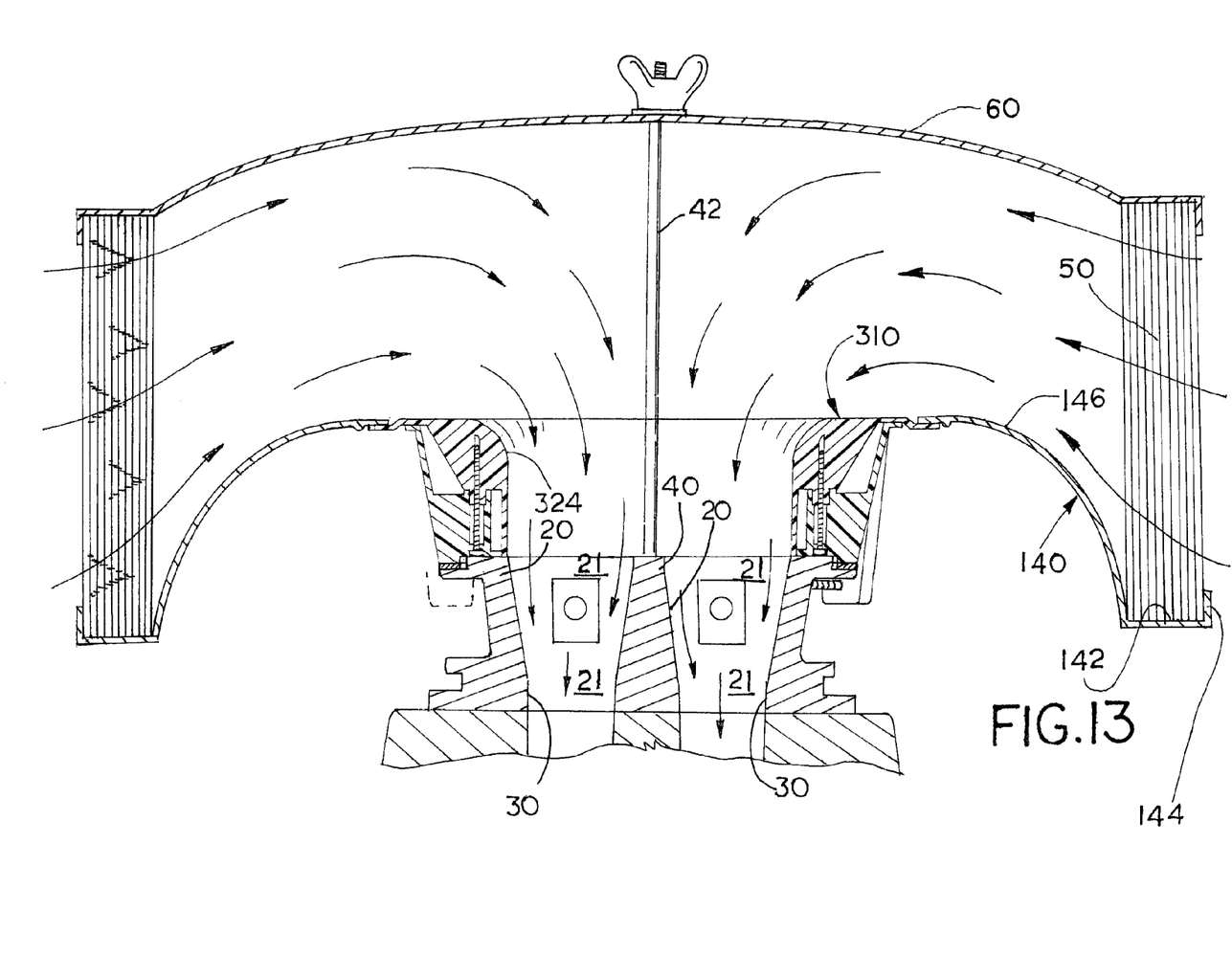
FIG. 13 is a simplified side sectional view of the attachment assembly using the airflow crown of FIG. 11 showing airflow through an air filter into the carburetor.

FIGS. 11-13 illustrate a third embodiment of the airflow crown of this invention, which is designated generally as reference numeral 300. Again, airflow crown 300 is substantially identical to airflow crown 100 in construction, configuration and function. Like airflow crown 100, Airflow crown 300 has an "open intake" but is dimensionally taller than airflow crown 100. As shown, the top of airflow crown 300 is spaced further above the top of carburetor 10, but intake surface 324 still extends over the shoulders of carburetor 10 and downward and around the carburetor mouth. As a result, intake surface 324 is longer and has more surface area compared to airflow crown 100.

Figure 14:
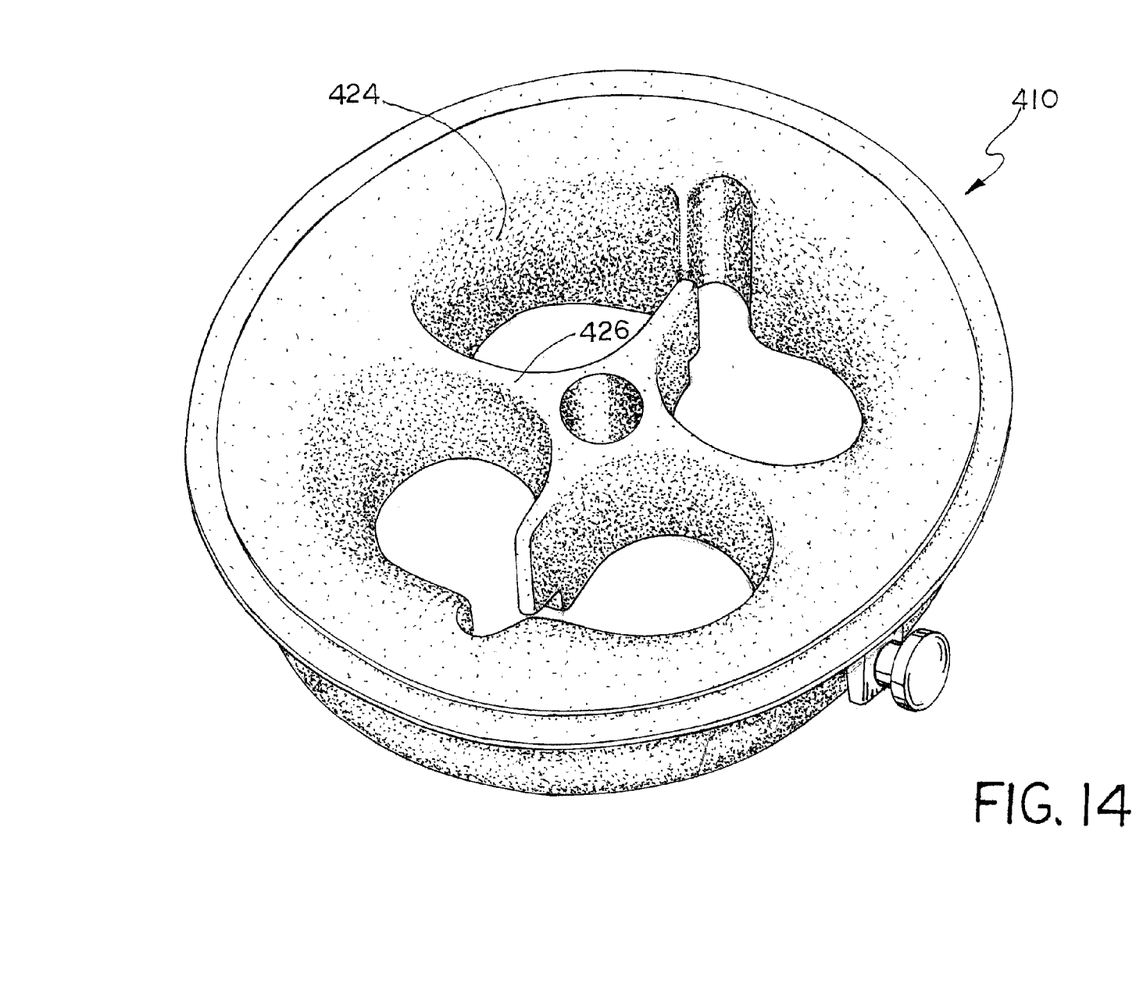
FIG. 14 is a perspective view of a fourth embodiment of the airflow crown of this invention.

FIG. 14 illustrates a fourth embodiment of the airflow crown of this invention, which is designated generally as reference numeral 400. Airflow crown 400 is similar to airflow crown 200 having a "divided intake" but uses the taller body dimensions of airflow crown 300. As shown, intake surface 424 extends over the shoulders of carburetor 10. In addition, intake surface 424 and the sidewalls of cruciform partition 426 extend downward toward the carburetor mouth and partially around each of the induction bores 31.

One skilled in the art will note that each embodiment of airflow crown 100, 200, 300 and 400 is configured to improve laminar airflow into the mouth of carburetor 10, which improves engine performance. The intake surface of the airflow crowns converges inward and extends downward around the mouth of the carburetor at the top of the induction bores. The walls forming the intake surface and partition merge directly into and around the sidewalls of the carburetor mouth and induction bores providing a smooth continuous transition between the two surfaces, which improves laminar airflow and directs the airflow downward into the induction bores.

While the power characteristics of any engine are unique to that engine and its particular setup, the use of any of the particular embodiments of the airflow crown will provide a unique performance improvement in the engine's power curve. Each airflow crown has a different heights and/or intake configurations (that is an "open" verse a "divided" intake) that produces a unique power curve with unique horsepower increases for any given engine. For example, the use of "short" airflow crown 100 may yield horsepower increases at lower RPMs while the use of tall airflow crown 200 may yield horsepower increases at higher RPMs for a given engine. Similarly, switching between "open intake" airflow crown 100 and "divided intake" airflow crown 300 yield differing power curves for a given engine.

In racing and high performance applications, multiple airflow crowns of varying heights and intake configurations may be mounted and tested to determine the particular performance advantages of each crown on a given engine. Then, the airflow crowns can be selectively interchanged to meet desired performance requirements. The quick connection mounting mechanism employed by each embodiment of the airflow crowns allows for the quick, convenient tool-less interchange of an airflow crown to any carburetor. The use of interchangeable airflow crowns also provides a quick and easy way for adjusting engine performance without mechanically adjusting the many delicate and complex valves, springs and other mechanical settings of the carburetor itself.

Figure 15:
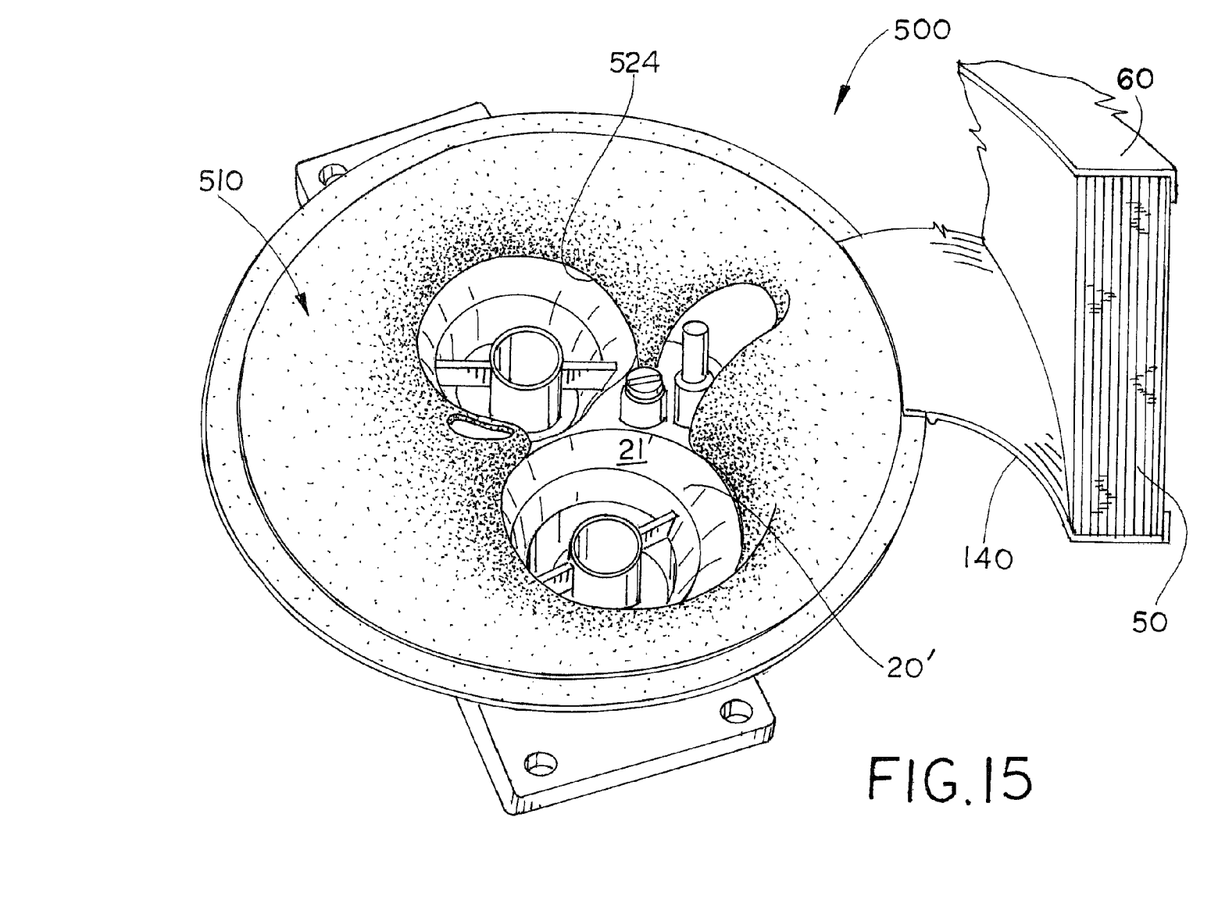
FIG. 15 is a perspective view of a fifth embodiment of the airflow crown of this invention mounted atop a "two barrel" carburetor.

FIG. 15 illustrates a fifth embodiment of the airflow crown of this invention, which is designated generally as reference numeral 500. Airflow crown 500 is similar to the above described embodiment, but is specifically adapted for use with a two barrel carburetor 10'. As shown, airflow crown 500 has an open intake, but may also be configured having a divided intake with an integral partition (not shown) as desired. Again the curvature and shape of surface 524 is configured to conform to the shape and slope of sidewall 20' which defines carburetor mouth 21, so that the surfaces meet and transition into one another in a substantially smooth and congruent manner. As with the previously describe airflow crowns, airflow crown 500 is designed and configured for use with a filter base (not shown) that allows the use of conventional air filter assemblies (not shown). Airflow crown 500 illustrates how the shape and configuration of the airflow crown may be modified and adapted for use with any make or style of carburetor within the teachings of this invention, regardless of barrel configuration or carburetor shape.

The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

We claim:

1. An assembly for directing air flow into a carburetor, where the carburetor includes an inner peripheral sidewall that defines a mouth thereof and at least two induction bores extending from the mouth through the carburetor and being defined by separate bore sidewalls, the assembly comprising:
    a first component adapted to sit directly atop the carburetor over the mouth, the first component includes means for detachably securing the first component to the carburetor and has a central opening therein defined by an intake surface that descends into the carburetor mouth and meets the inner peripheral sidewall of the carburetor, so that the inner intake surface and the peripheral sidewall of the carburetor are contiguous and together provide a substantially smooth continuous airfoil surface into the induction bores when the first component is seated atop the carburetor, the first component has a partition extending into the central opening thereof for dividing airflow entering the carburetor mouth into each of the at least two induction bores; and
    a second component adapted to mate with the first component for supporting an air filter assembly.

2. The assembly of claim 1 wherein the intake surface is spaced over the carburetor mouth at a predetermined height.

3. The Assembly of claim 1 wherein the partition extends partially around the bore sidewalls and meets the bore sidewalls so that the inner intake surface and the peripheral sidewall of the carburetor are contiguous and form part of the airfoil surface.

4. The assembly of claim 1 wherein the second component has a central opening therein and a curved annular inner surface around the central opening that meets the intake surface when the second component is mounted to the first component, so that the inner surface of the second component and the intake surface of the first component are contiguous and form part of the airfoil surface.

5. The assembly of claim 1 wherein the first component has a peripheral edge, the second component seated atop the first component peripheral edge when the second component is mounted to the first component.

6. The assembly of claim 1 wherein the second component also has a peripheral tray for receiving an annular air filter thereon.

7. An air flow director for a carburetor where the carburetor includes an inner peripheral sidewall that defines a mouth thereof and at least two induction bores extending from the mouth through the carburetor and being defined by separate bore sidewalls, the air flow director comprising:

a body adapted to sit directly atop the carburetor over the mouth, the body has a central opening defined by an annular intake surface that descends into and around the carburetor mouth and meets the inner peripheral sidewall of the carburetor, so that the inner intake surface and the peripheral sidewall of the carburetor are contiguous and together provide a substantially smooth continuous airfoil surface into the induction bores when the body is mounted atop the carburetor, the first component has a partition extending into the central opening thereof for dividing airflow entering the carburetor mouth into each of the at least two induction bores; and means connected to the body for detachably securing the body to the carburetor.

8. The assembly of claim 7 wherein the intake surface is spaced over the carburetor mouth at a predetermined height.

9. The Assembly of claim 7 wherein the partition extends partially around the bore sidewalls and meets the bore sidewalls so that the inner intake surface and the peripheral sidewall of the carburetor are contiguous and form part of the airfoil surface.

* * * * *